(12) United States Patent
Abbott et al.

(10) Patent No.: US 7,533,082 B2
(45) Date of Patent: *May 12, 2009

(54) SOLICITING INFORMATION BASED ON A COMPUTER USER'S CONTEXT

(75) Inventors: Kenneth H. Abbott, Kirkland, WA (US); James O. Robarts, Redmond, WA (US); Dan Newell, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/179,822

(22) Filed: Jul. 11, 2005

(65) Prior Publication Data

US 2006/0136393 A1      Jun. 22, 2006

Related U.S. Application Data

(63) Continuation of application No. 09/824,900, filed on Apr. 2, 2001, now Pat. No. 6,968,333.

(60) Provisional application No. 60/194,000, filed on Apr. 2, 2000, provisional application No. 60/194,758, filed on Apr. 2, 2000.

(51) Int. Cl.
    *G06F 17/30* (2006.01)
(52) U.S. Cl. .................................. 707/3; 707/4; 707/10
(58) Field of Classification Search ..................... 707/3, 707/10, 4
    See application file for complete search history.

(56) References Cited

U.S. PATENT DOCUMENTS

| 5,710,884 | A | 1/1998 | Dedrick .................. 395/200.47 |
| 5,966,126 | A | 10/1999 | Szabo ........................ 345/348 |
| 6,055,516 | A | 4/2000 | Johnson et al. ............... 705/27 |
| 6,081,814 | A | 6/2000 | Mangat et al. ............. 707/501 |
| 6,098,065 | A | 8/2000 | Skillen et al. .................. 707/3 |
| 6,169,976 | B1 | 1/2001 | Colosso ...................... 705/59 |
| 6,199,099 | B1 * | 3/2001 | Gershman et al. ........... 709/203 |
| 6,256,633 | B1 | 7/2001 | Dharap ....................... 707/10 |
| 6,263,317 | B1 | 7/2001 | Sharp et al. .................. 705/26 |
| 6,272,507 | B1 | 8/2001 | Pirolli et al. ................ 707/513 |
| 6,282,517 | B1 | 8/2001 | Wolfe et al. .................. 705/26 |
| 6,292,796 | B1 * | 9/2001 | Drucker et al. ................. 707/5 |

(Continued)

FOREIGN PATENT DOCUMENTS

| WO | WO99/26180 | 5/1999 |
| WO | WO99/67698 | 12/1999 |

OTHER PUBLICATIONS

Bier et al., "Toolglass and Magic Lenses: The See-Through Interface," Proceedings of Siggraph '93, *Computer Graphics Annual Conference Series*, ACM, pp. 73-80, Anaheim, California, 1993.

Doorenbos, R. B. et al., "A Scalable Comparison-Shopping Agent for the World-Wide Web," Proceedings of the First International Conference on Autonomous Agents, Marina del Rey, California, Feb. 5-8, 1997, New York, Jan. 1997, pp. 39-48.

(Continued)

*Primary Examiner*—Jean M Corrielus
(74) *Attorney, Agent, or Firm*—Amin, Turocy & Calvin, LLP

(57) ABSTRACT

A user search request is received and context information for the user is identified. The user search request and the context information are then combined to generate search criteria corresponding to the user search request, providing for information solicitation based on a computer user's context.

18 Claims, 9 Drawing Sheets

U.S. PATENT DOCUMENTS

| | | | |
|---|---|---|---|
| 6,317,718 B1 * | 11/2001 | Fano | 705/1 |
| 6,349,307 B1 * | 2/2002 | Chen | 707/103 X |
| 6,353,823 B1 * | 3/2002 | Kumar | 707/3 |
| 6,356,905 B1 * | 3/2002 | Gershman et al. | 707/10 |
| 6,363,377 B1 | 3/2002 | Kravets et al. | 707/4 |
| 6,401,085 B1 * | 6/2002 | Gershman et al. | 707/4 |
| 6,405,206 B1 | 6/2002 | Kayahara | 707/102 |
| 6,430,531 B1 | 8/2002 | Polish | 704/257 |
| 6,442,549 B1 | 8/2002 | Schneider | 707/10 |
| 6,466,232 B1 | 10/2002 | Newell et al. | 345/700 |
| 6,490,579 B1 | 12/2002 | Gao et al. | 707/4 |
| 6,505,196 B2 * | 1/2003 | Drucker et al. | 707/5 |
| 6,542,889 B1 | 4/2003 | Aggarwal et al. | 707/5 |
| 6,549,915 B2 | 4/2003 | Abbott, III et al. | 707/104.1 |
| 6,704,722 B2 * | 3/2004 | Wang Baldonado | 707/3 |
| 6,738,759 B1 * | 5/2004 | Wheeler et al. | 707/3 |
| 6,834,195 B2 * | 12/2004 | Brandenberg et al. | 455/456.3 |
| 6,868,525 B1 * | 3/2005 | Szabo | 715/738 |
| 6,885,734 B1 * | 4/2005 | Eberle et al. | 379/88.01 |
| 7,349,894 B2 * | 3/2008 | Barth et al. | 707/3 |
| 7,386,477 B2 * | 6/2008 | Fano | 705/26 |
| 7,395,221 B2 * | 7/2008 | Doss et al. | 705/9 |
| 2002/0147880 A1 | 10/2002 | Wang et al. | 711/1 |

OTHER PUBLICATIONS

Schmidt, A. et al, "There is More to Context Than Location," Computers and Graphics, Pergamon Press Ltd., Oxford, Great Britan, vol. 23, No. 6, Dec. 1999, pp. 893-901.
U.S. Appl. No. 09/541,326, filed Apr. 2, 2000, Abbott et al.
U.S. Appl. No. 09/724,777, filed Nov. 28, 2000, Abbott et al.
U.S. Appl. No. 09/724,902, filed Nov. 28, 2000, Abbott et al.
U.S. Appl. No. 60/194,758, filed Apr. 2, 2000, Newell et al.
Partial International Search, PCT/US01/10604, Nov. 15, 2002, 3 pages.

* cited by examiner

SOLICITING INFORMATION BASED ON A COMPUTER USER'S CONTEXT

RELATED APPLICATIONS

This application is a continuation of U.S. patent application No. 09/824,900, filed Apr. 2, 2001 and now U.S. Pat. No. 6,968,333. U.S. patent application No. 09/824,900 claims priority to provisional application number 60/194,000, filed Apr. 2, 2000, which is hereby incorporated by reference, and also claims priority to provisional application No. 60/194,758, filed Apr. 9, 2000, which is hereby incorporated by reference.

TECHNICAL FIELD

This disclosure relates generally to computer-assisted solicitation of desired information, and more particularly to soliciting information based on a computer user's context.

BACKGROUND

As computers become increasingly powerful and ubiquitous, users increasingly employ their computers for a broad variety of tasks. For example, in addition to traditional activities such as running word processing and database applications, users increasingly rely on their computers as an integral part of their daily lives. Programs to schedule activities, generate reminders, and provide rapid communication capabilities are becoming increasingly popular. Moreover, computers are increasingly present during. virtually all of a person's daily activities. For example, hand-held computer organizers (e.g., PDAs) are more common, and communication devices such as portable phones are increasingly incorporating computer capabilities. Thus, users may be presented with output information from one or more computers at any time.

Accompanying the increasing use and portability of computers is an increasing desire on the part of users to obtain information through wireless and other communication media. When a consumer becomes aware of a situation in which they perceive a need that might be able to be fulfilled with goods or services that may or may not be available, they are currently limited in how they can gain product information. Often, when the need arrives, the consumer is not in a convenient circumstance to review printed materials, ask others, or wait for uncontrolled media like radio or television to present an advertisement or review. This inconvenience may result in the user choice that if significant effort or time is required to learn about potential product claims, availability, or cost is required to learn about the offered goods and services, then it is not worth it.

The advent of computers, especially when coupled to the data-rich environment of the Internet, expands consumer's ability to gain product information without regard for geographic proximity or time of day. However, current product search techniques rely on either what the user has directly specified (e.g., in a search text box), or past behavior (e.g., Internet merchants tracking past purchases). And, even though many product providers collect and sell individual and aggregate consumer profiles, and so do sometimes provide assistance to consumers as they consider offered products, there is currently no general mechanism such that detailed user characterizations can facilitate the location of a specific desired product or information.

Some Internet-related products, such as the Microsoft® Internet Explorer web browser, can record the information that a user enters in form fields. When the user begins filling out a new form, those values can automatically be entered or suggested, easing the form completion. Despite this easing, problems still exist with such products. One problem is that the user is limited to data already entered in other forms. Another problem is that such products require presentation to the user of form fields that are already filled out, which can be inconvenient for the user and degrade from the user-friendliness of the solution (e.g., it can be inconvenient for the user to see his or her name for every form).

Accordingly, there is a need for improved techniques for soliciting information.

SUMMARY

Soliciting information based on a computer user's context is described herein.

According to one aspect, a user search request is received and context information for the user is identified. The user search request and the context information are then combined to generate search criteria corresponding to the user search request. The context information includes, for example, information regarding one or more of: the user's physical environment, the user's mental environment, the user's computing environment, and the user's data environment.

According to another aspect, a product interest characterization (PIC) is generated that includes multiple fields, some fields being populated with user-defined data inputs and other fields being populated with automatically-generated user context information. The generated PIC is then communicated to one or more information sources where the PIC is compared with information at these sources to identify content that matches the parameters in the various fields of the PIC. The matching content is then presented to the user.

DETAILED DESCRIPTION

Figure 1:
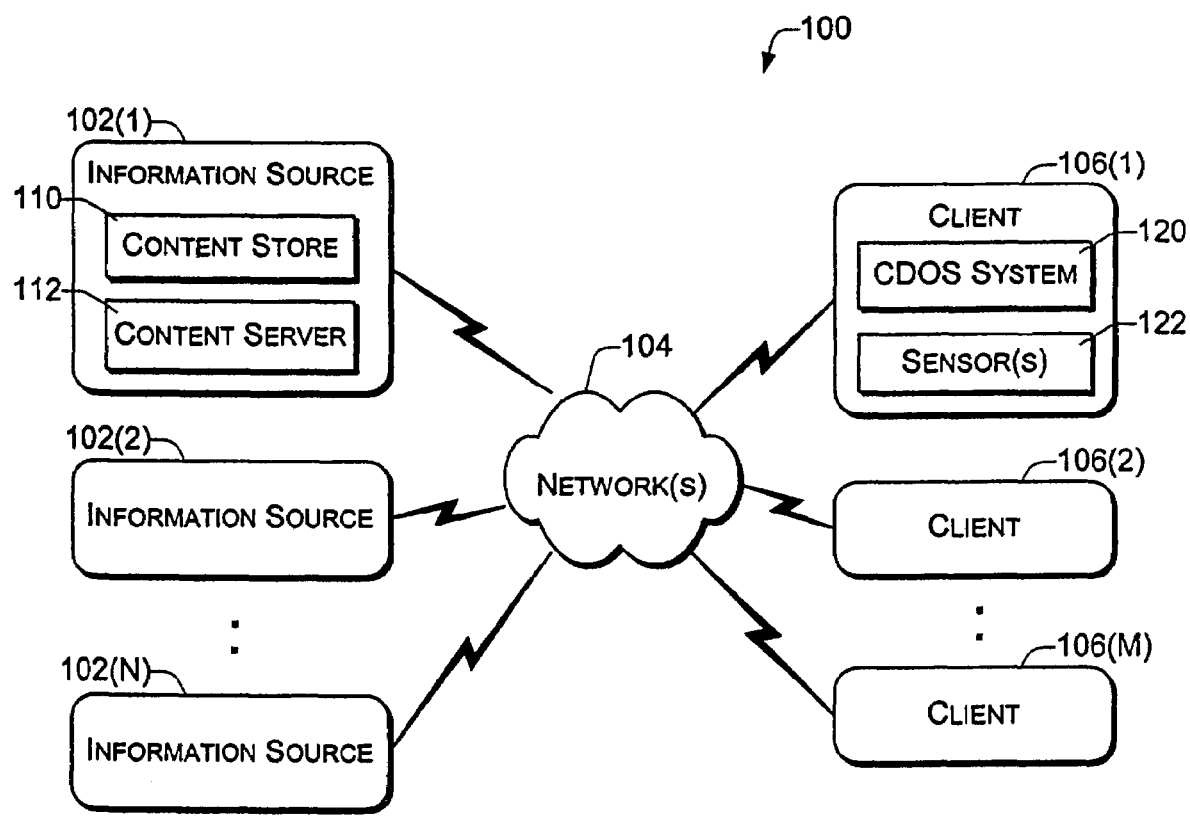
FIG. 1 shows an exemplary system 100 including multiple information sources and multiple clients.

This disclosure describes soliciting information for a user based at least in part on the user's context. Search parameters or other data associated with a user's search request is combined with context information for the user to generate search criteria. The search criteria can then be compared with data (stored locally and/or remotely) to identify information that matches the search criteria. The user is able to solicit any of a wide variety of information, such as advertisements (e.g., of products or services), reference materials (e.g., electronic books or articles), as well as actual goods or products themselves (e.g., in electronic form (such as audio content that can be downloaded and played immediately), or for more traditional physical delivery (such as ordering a coat and having it shipped via an overnight shipping agent)). FIG. 1 shows a system 100 in which multiple information sources 102(1), 102(2), . . . , 102(N) transmit information over one or more networks 104 to multiple clients 106(1), 106(2), . . . , 106(M). The information is typically solicited by the clients, and hence is said to be "pulled" from the information sources 102 to the clients 106.

Information sources 102 may be implemented in a number of ways, such as a host server at a Website, a dedicated search engine (e.g., that stores information for searching but not the content for search hits), a voice-driven telephony system, and so forth. The content can be organized and made available to clients 106 in any of a wide variety of conventional manners. As one exemplary implementation, an information source, as represented by source 102(1), may include a content store 110 to store the information and a content server 112 to serve the content to clients 106. The information communicated from the information sources may be in any data type (e.g., text, graphics, audio, video, etc.) and contain essentially any type of subject matter. As one particular example, the information may be in the form of solicited advertisements or product/service descriptions pulled to clients 106 from advertisers. Network 104 is representative of many different network types, including public networks (e.g., the Internet) and/or proprietary networks. The network may be implemented using wireless technologies (e.g., RF, microwave, cellular, etc.), wire-based technologies (e.g., cable, fiber optic, wire, etc.), or a combination of them. Any one or more of many diverse protocols and formats may be used to package data and transmit it from source 102 to a client 106.

Clients 106 may be implemented in a variety of ways, including as computers, portable digital assistants (PDAs), communication devices, and the like. The clients are equipped with conventional mechanisms to receive the information from network 104, such as ports, network cards, receivers, modems, and so on.

Each client, as represented by client 106(1), is equipped with a Condition-Dependent Output Supplier (CDOS) system 120 that monitors the user and the user's environment. As the user moves about in various environments, the CDOS system receives various input information including explicit user input, sensed user information, and sensed environment information. The CDOS system maintains and updates a model of the user condition. One or more sensors 122 provide data to the CDOS system 120 pertaining to the user's environment.

Figure 2:
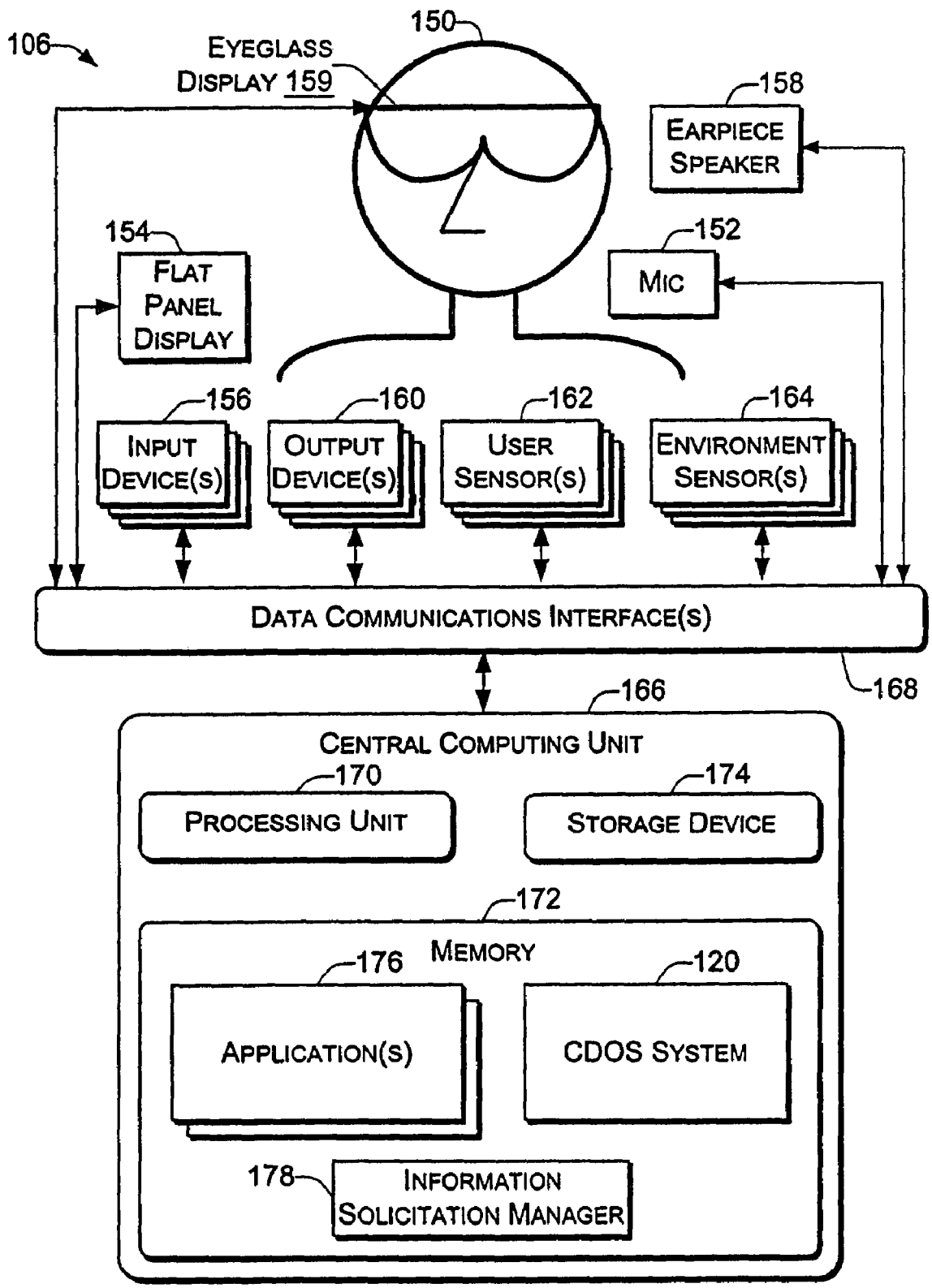
FIG. 2 illustrates an exemplary suitable implementation of a client as a body-mounted wearable computer worn by a user.

FIG. 2 illustrates one suitable implementation of client 106 as a body-mounted wearable computer worn by a user 150. The computer 106 includes a variety of body-worn input devices, such as a microphone 152, a hand-held flat panel display 154 with character recognition capabilities, and various other user input devices 156. Examples of other types of input devices with which a user can supply information to the computer 106 include speech recognition devices, traditional qwerty keyboards, chording keyboards, half qwerty keyboards, dual forearm keyboards, chest mounted keyboards, handwriting recognition and digital ink devices, a mouse, a track pad, a digital stylus, a finger or glove device to capture user movement, pupil tracking devices, a gyropoint, a trackball, a voice grid device, digital cameras (still and motion), and so forth.

The computer 106 also has a variety of body-worn output devices, including the hand-held flat panel display 154, an earpiece speaker 158, and a head-mounted display in the form of an eyeglass-mounted display 159. Other output devices 160 may also be incorporated into the computer 106, such as a tactile display, an olfactory output device, tactile output devices, and the like.

The computer 106 may also be equipped with one or more various body-worn user sensor devices 162. For example, a variety of sensors can provide information about the current physiological state of the user and current user activities. Examples of such sensors include thermometers, sphygmometers, heart rate sensors, shiver response sensors, skin galvanometry sensors, eyelid blink sensors, pupil dilation detection sensors, EEG and EKG sensors, sensors to detect brow furrowing, blood sugar monitors, etc. In addition, sensors elsewhere in the near environment can provide information about the user, such as motion detector sensors (e.g., whether the user is present and is moving), badge readers, still and video cameras (including low light, infra-red, and x-ray), remote microphones, etc. These sensors can be both passive (i.e., detecting information generated external to the sensor, such as a heart beat) or active (i.e., generating a signal to obtain information, such as sonar or x-rays).

The computer 106 may also be equipped with various environment sensor devices 164 that sense conditions of the environment surrounding. the user. For example, devices such as microphones or motion sensors may be able to detect whether there are other people near the user and whether the user is interacting with those people. Sensors can also detect environmental conditions that may affect the user, such as air thermometers or Geiger counters. Sensors, either body-mounted or remote, can also provide information related to a wide variety of user and environment factors including location, orientation, speed, direction, distance, and proximity to other locations (e.g., GPS and differential GPS devices, orientation tracking devices, gyroscopes, altimeters, accelerometers, anemometers, pedometers, compasses, laser or optical range finders, depth gauges, sonar, etc.). Identity and informational sensors (e.g., bar code readers, biometric scanners, laser scanners, OCR, badge readers, etc.) and remote sensors (e.g., home or car alarm systems, remote camera, national weather service web page, a baby monitor, traffic sensors, etc.) can also provide relevant environment information.

The computer 106 further includes a central computing unit 166 that may or may not be worn on the user. The various inputs, outputs, and sensors are connected to the central computing unit 166 via one or more data communications interfaces 168 that may be implemented using wire-based technologies (e.g., wires, coax, fiber optic, etc.) or wireless technologies (e.g., RF, etc.).

The central computing unit 166 includes a central processing unit (CPU) 170, a memory 172, and a storage device 174. The memory 172 may be implemented using both volatile and non-volatile memory, such as RAM, ROM, Flash, EEPROM, disk, and so forth. The storage device 174 is typically implemented using non-volatile permanent memory, such as ROM, EEPROM, diskette, memory cards, and the like.

One or more application programs 176 are stored in memory 172 and executed by the CPU 170. The application programs 176 generate data that may be output to the user via one or more of the output devices 154, 158, 159, and 160.

In the illustrated implementation, the CDOS system 120 is shown stored in memory 172 and executes on the processing unit 170. The CDOS system 120 monitors the user and the user's environment, and creates and maintains an updated model of the current condition of the user. As the user moves about in various environments, the CDOS system receives various input information including explicit user input, sensed user information, and sensed environment information. The CDOS system updates the current model of the user condition, and presents output information to the user via appropriate output devices.

A more detailed explanation of the CDOS system 120 may be found in a co-pending U.S. patent application Ser. No. 09/216,193, entitled "Method and System For Controlling Presentation of Information To a User Based On The User's Condition", which was filed Dec. 18, 1998, and is commonly assigned to Tangis Corporation. The reader might also be interested in a more detailed discussion of context attributes (or condition variables) discussed in U.S. patent application Ser. No. 09/724,902, entitled "Dynamically Exchanging Computer User's Context", which was filed Nov. 28, 2000, and is commonly assigned to Tangis Corporation. These applications are hereby incorporated by reference.

An optional information solicitation manager 178 is also shown stored in memory 172 and executes on processing unit 170. Information solicitation manager 178 utilizes data from CDOS system 120 to generate search criteria based on the user's current environment. Alternatively, information solicitation manager 178 and CDOS system 120 may be implemented at a remote location (e.g., not in close physical proximity to the user 150).

The body-mounted computer 106 may be connected to one or more networks through wired or wireless communication technologies (e.g., wireless RF, a cellular phone or modem, infrared, physical cable, a docking station, etc.). For example, the body-mounted computer of a user could make use of output devices in a smart room, such as a television and stereo when the user is at home, if the body-mounted computer can transmit information to those devices via a wireless medium or if a cabled or docking mechanism is available to transmit the s information. Alternately, kiosks or other information devices can be installed at various locations (e.g., in airports or at tourist spots) to transmit. relevant (and typically, unsolicited) information to body-mounted computers within the range of the information device.

Figure 3:
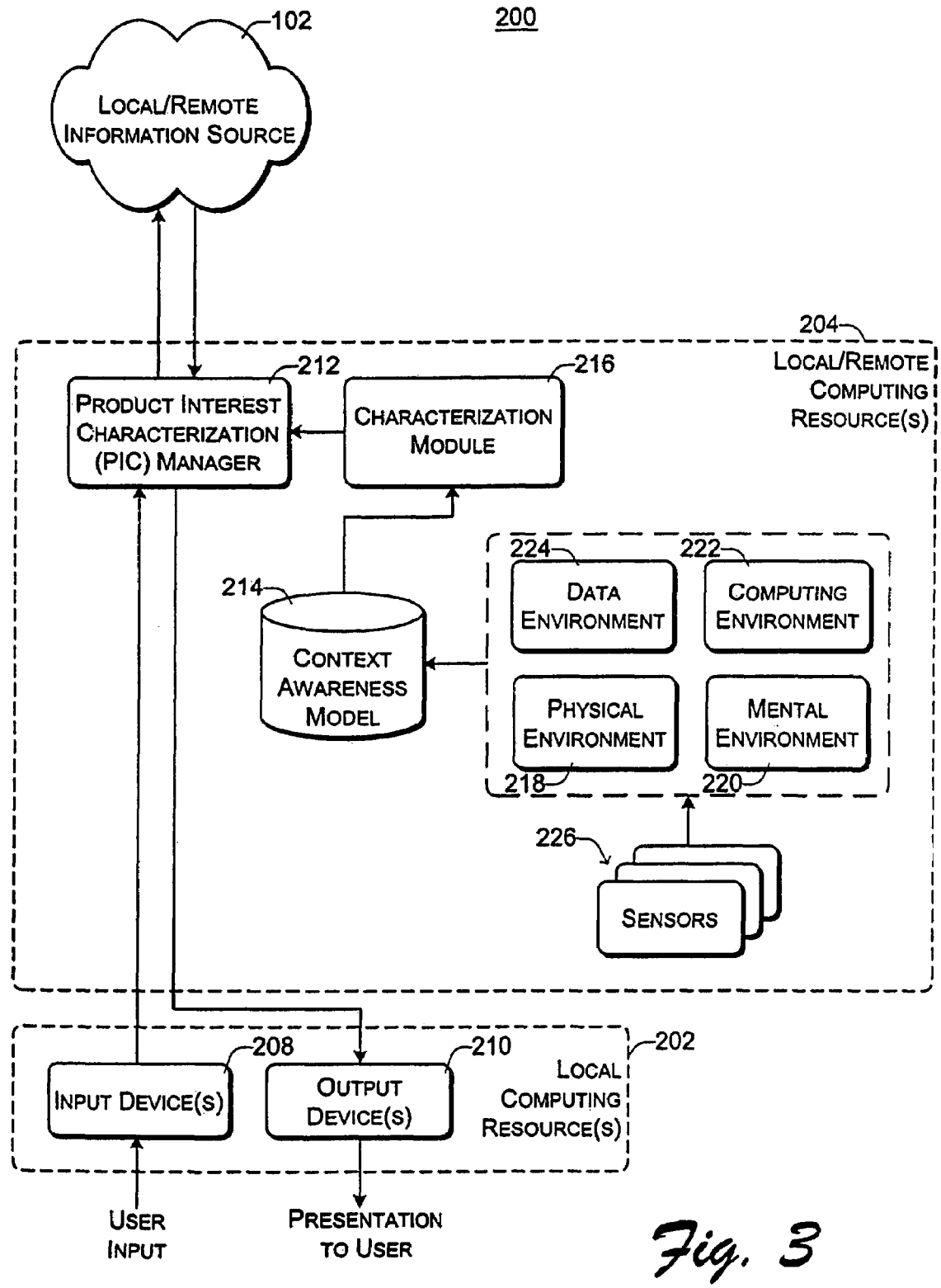
FIG. 3 illustrates an exemplary information solicitation environment including multiple computing resources and searchable information sources.

FIG. 3 illustrates an exemplary information solicitation environment 200 including multiple computing resources. 202 and 204, as well as searchable information sources or providers 102. Solicitation environment 200 allows a user to solicit information from information sources 102. The user is able to input a search request via one or more local input devices 208 (e.g., devices 152 or 156 of FIG. 2). Information that is found based at least in part on the input search request is then presented to the user via one or more output devices 210 (e.g., devices 154, 158, 159, or 160). The input and output devices 208 and 210 are local resources 202, being local (in close physical proximity) to the user. Other resources, discussed in more detail below, can be implemented local to the user and/or remote from the user.

User search requests are input to an information solicitation management component, which, in the illustrated example, is a product interest characterization (PIC) manager 212. PIC manager 212 receives the user request and combines the request with the user's current context from context awareness model 214 in order to generate search criteria. The generated search criteria is then communicated to the locally and/or remotely situated information source 102. The search criteria is compared to the information at source 102 (e.g., an Internet search engine) to s determine what information (if any) at source 102 matches the search criteria, and optionally how well that information matches the search criteria. The results of the comparison are then returned to PIC manager 212, which returns the results as appropriate to output device (s) 210 for presentation to the user. The results returned to PIC manager 212 may be sufficient to present to. the user, or alternatively may only identify content that needs to be accessed by PIC manager 212 and presented to the user. For example, the results returned to PIC manager 212 may be a set of uniform resource locators (URLs). Those URLs may be presented to the user, or alternatively PIC manager 212 may access the locations identified by those URLs and return the content at those locations for presentation to the user.

Context awareness model 214 maintains context information for the user, allowing a characterization module 216 to attempt to characterize the user's context (e.g., his or her current context at the time a user search request is made by the user and/or received by PIC manager 212) and communicate this context information to PIC manager 212. Context awareness model 214 is built based on input from various modules 218, 220, 222, and 224 that capture and pass information based on inputs from one or more sensors 226 (e.g., environment sensors 164, user sensors 162, etc. of FIG. 2). Sensors 226 monitor the environment parameters and provide data to the modules 218-224, and can be local to the user and/or remote from the user. Sensors 226 can be any transducer or software module that provides data used (or potentially used) in the context awareness model 214.

In the illustrated implementation, the context awareness model 214 gathers information on (1) the user's physical environment from module 218, (2) the user's mental environment from module 220, (3) the user's computing environment from module 222, and (4) the user's data environment from module 224.

Physical environment module 218 generates information pertaining to the user's present location (e.g., geographical, relative to a structure such as a building, etc.), the current time, and surrounding objects that may be used as a basis for searching. As an example of this latter situation, a user with a wearable computer may be traversing through a mall having numerous stores therein. While in this location, the user may request product sale information and only advertisements of products sold in stores in the mall and currently on sale are presented to the user.

The mental environment module 220 generates information pertaining to the user's likely intentions, their preferences, and their current attention. For instance, the mental environment module 220 may use data from a pupil tracking sensor or head orientation sensor to identify a direction or object on which the user is focused. If the user appears to be focused on administrative items presented on the heads up display, then the user context module 220 might determine that it is safe to present search results.

The computing environment module 222 generates information pertaining to the computing capabilities of the client, including available I/O devices, connectivity, processing capabilities, available storage space, and so on. The data environment module 224 generates information pertaining to the data and software resources on the client computer, including the communication resources, applications, operating system, and data.

The search criteria generated by PIC manager 212 is encapsulated in a data structure referred to as a PIC. A PIC is the data that is sent from the consumer computing system (e.g., PIC manager 212) to information sources 102. If the information provider determines that there is content that sufficiently conforms to the consumer's interest (e.g., matches all of the search criteria, or at least a threshold amount of the search criteria), an indication of a match, optionally with product description information and other commerce facilitating code and data, can be sent to the consumer.

A PIC can contain a variety of information for a variety of purposes. Table I illustrates exemplary information that may be included in a PIC. A PIC, however, need not include all of the information in Table I. Rather, different PICs can include different subsets of the information described in Table I.

TABLE I

| Information | Description |
| --- | --- |
| Keywords | A distillation of desired information (e.g., product characteristics). Keywords are typically chosen for brevity and precision, and can serve as search terms for many of the currently available Internet search engines. |
| Context Awareness Attributes | Contain any data (e.g., name/value pair(s)) characterizing the user's current or past context. Based on information received from the characterization module. |
| Security Keys | Allows some or all PIC data to be read by only intended recipients. This may be optionally included when security issues are important to the consumer and/or the information provider. |
| Internet Cookies | Allows an Internet site to identify and profile a particular consumer. This may be optionally included by the user to facilitate repeat business or information requests. |
| User Comments | Information the user may wish to include to more fully characterize their interests. Note that information providers may supplement their automated processes with people who can review PICs of interest. It should therefore not be assumed that a PIC must contain only machine understandable data. For instance, a PIC can be in the form of an audio file, which the user recorded and has the computer send to product information providers' telephony systems. |
| Code | Support a variety of executable code formats. For instance, information providers may support advanced queries using SQL, or automatic purchase mechanisms may be shared. These mechanisms may first be provided by the information provider, and then included in the PIC during subsequent purchase requests. May be used to support the convenient purchase of items satisfying a sufficient number of parameters in the PIC. |
| Filters | A special case of code. Filters aid the interpretation of interest characterizations. They can also be used by the information return process to restrict when search results are presented to the user. |
| Authorizations | Allows the user to indicate how much data can be provided to different classes of product information providers. This information can include purchase-enabling information like credit card numbers. This is part of a general CA permissioning scheme, that supports dynamic authorizations. Therefore, depending on the current context of the user, the PIC can change its: exposure (who sees it), content (what it contains), and validity (how well does it match desired goods, services, or information). |
| Consumer Identification | Provides an identification of the user. This identification may not necessarily correspond with any legal identification. For instance, it may be unique to a particular product information provider, or class of product information provider. |
| PIC Version | Identifies what version of the PIC manager the PIC data is conforming to. |
| PIC Certificates | Securely identifies the origin of the component generating the PIC. |
| PIC Description | Describes the fields included in a particular PIC, as well as their purpose and use. |
| Previous Search Results | Provides search facilities with a history of what the consumer has already been provided, so, among other functions, allows the search engine to eliminate providing repetitive information. |
| Weighting | Characterizes what the consumer found interesting in previous information searches. |
| Purchase History | Characterizes what the consumer had previously purchased. In some cases, this information can be very detailed and so provide a rich product interest characterization. |

PIC manager 212 is thus able to formulate search criteria (e.g., in the form of PICs) encompassing a wide variety of different information. This can include, for example, basic keyword inputs by the user which are then combined with other information (e.g., from context awareness model 214) by PIC manager 212 to formulate the search criteria.

Figure 4:
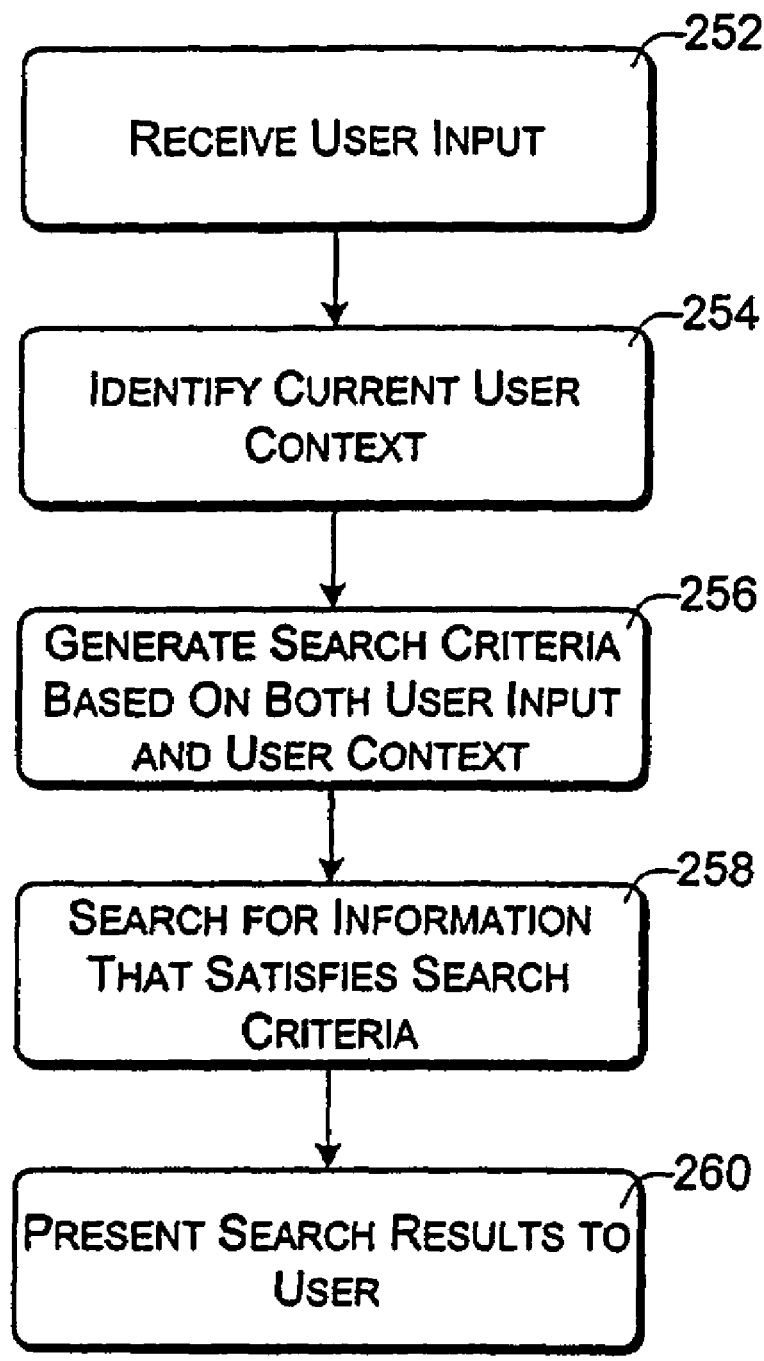
FIG. 4 is a flowchart illustrating an exemplary process for soliciting information based at least in part on the user's context.

FIG. 4 is a flowchart illustrating an exemplary process for soliciting information based at least in part on the user's context. The process of FIG. 4 is performed by, for example, PIC manager 212 of FIG. 3, and may be implemented in software.

Initially, user input is received (act 252). The current user context is then identified (act 254), and search criteria (e.g., a PIC) generated based on both the received user input and the identified user context (act 256). A search is then performed for information that satisfies the search criteria (act 258). The search may be performed by the component that generates the search criteria (in act 256), or alternatively the search may be performed by communicating the search criteria to a search component (e.g., an information store 102 of FIG. 3). Once the search is at least partly completed, the search results are presented to the user (act 260). Search results may be presented to the user as they are received by PIC manager 212, or alternatively after all searching has been completed.

One example of soliciting information involves the user passing (walking, riding, driving, etc.) a store and submitting an advertisement search request. The search criteria include the advertisement request as well as context information indicating that the user is in close proximity to the store. The search results include an advertisement that the store is selling a product (e.g., a specific brand of cigarettes, including cigarettes the user's context knows that the user has purchased in the past) for a price that the user may be willing to purchase the item (e.g., the cigarettes are on sale, or cheaper than other stores, or cheaper than the user's last purchase of cigarettes). The cigarette advertisement is thus presented to the user. In general terms the user's context determines whether a particular criteria is met and presents an advertisement (in this case, generated by the store, but not directed at specific consumers) to the user.

Figure 5:
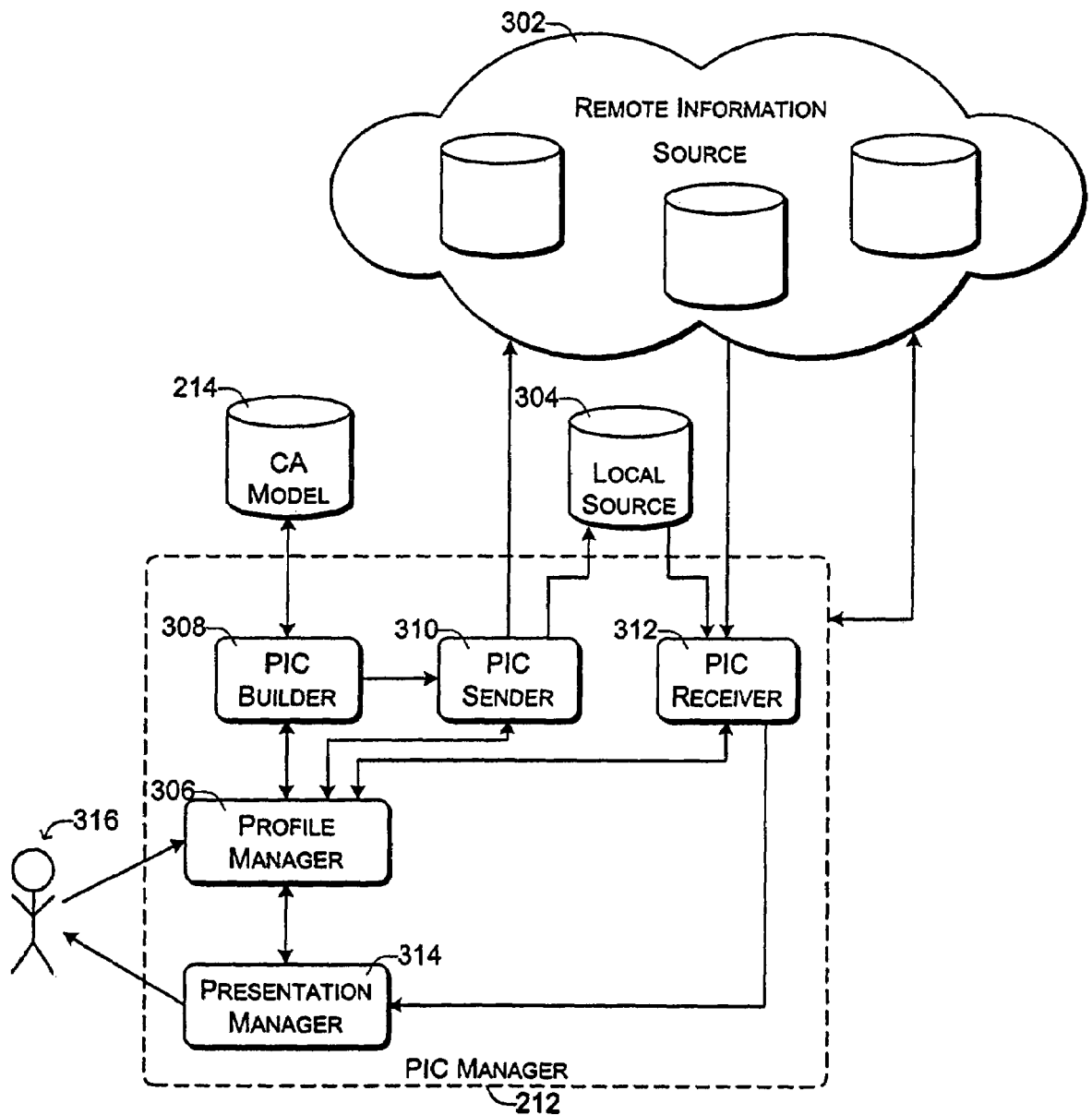
FIG. 5 illustrates an exemplary product interest characterization manager.

FIG. 5 illustrates an exemplary product interest characterization manager 212 in additional detail. PIC manager 212 is illustrated communicating with both remote information stores 302 and local information store 304, although alternatively PIC manager 212 may communicate with only one or the other of stores 302 and 304.

Additionally, PIC manager 212 may optionally maintain a user profile(s) for each user. By using the detailed, automatically updated, under user control, profile, PICs can be further customized or personalized to the individual users. The information maintained in a profile can include, for example, the user's needs (explicitly defined by user or inferred by system), desires (courses on dog training, good bargains, etc.), preferences (red leather with prominent logos, German sedans, etc.), budget (current cash, monthly goals, shared funds, credit limits, etc.), legal constraints (age, criminal history, licenses, etc.), physical limitations (require wheelchair entry/exit ramps, need sign-language interpretation, location must not be subject to cold winds, etc.), time availability (does user have enough time in schedule to review information or get product?, is movie too late in evening?), route (is supplier of product convenient to my planned route?), access to transportation (when will family car be available, what is bus schedule, etc.), need (is product already included in a shopping list?, is a product currently being used going to be depleted soon?), and so forth. The preceding considerations can be derived from, or supplemented by, past individual or aggregate consumer behaviors.

To solicit information, or add data to a PIC for subsequent solicitation requests, the user interacts with PIC manager 212. PIC manager 212 includes multiple PIC functionality modules: a profile manager 306, a PIC builder 308, a PIC sender 310, a PIC receiver 312, and a presentation manager 314. The user 316 can interact, either directly or indirectly, with these functionality modules.

Profile manager 306 allows user access and control for individual functions and specific PICs, and also allows the user to access and modify portions of the user's model context pertinent to product interest. For example, this is where a user can modify his or her address, credit card numbers and authorizations, shirt size, and so forth.

Profile manager module 306 presents various choices to the user, including: use profile (allows the user to select his or her profile (or one of his or her profiles) for use), change profile (allows the user to change information stored in his or her profile), view active/inactive PIC results (view any search results that have been received and stored by the PIC manager (e.g., because they were not supposed to be presented to the user yet)), change active/inactive PIC status (allows the user to have multiple PICs defined and toggle individual PICs between an active status (causing searches to be performed based on the data in the PIC) and inactive status (for which searches are not performed)), initiate new PICs (allows the user to create a new PIC, such as by entering search terms (key words)), help (makes a user help function available to the user).

PIC builder module 308 allows the user to generate new PICs and modify existing PICs. Once the user has generated a PIC, he or she can set the PIC status to active, causing PIC manager 212 to share the PIC with specified agencies, or whomever is interested, and has a compatible information description data store. PIC builder module 308 provides interfaces to help the user create PICs. In one implementation, PIC builder module 308 provides both blank PIC forms and default PIC forms to aid the user in the PIC creation process.

Blank PIC forms can be built from scratch using menus, tool bars, and other UI elements providing prompts for elemental PIC form fields (common fields like time, location, price, store, quality, material, and so forth), query building logic (AND, OR, NOT, SIMILAR, ONLY, ALL, INCLUDING, wildcards, and so forth). Blank forms can include automatically visible or hidden fields with values included derived from the context model.

Default PIC Forms are forms that are at least partly filled in, relating to specific information categories. For example, there can be a default PIC form for "New Car", which would present fields that are useful in specifying a car of interest.

By default, PIC forms do not show form fields that the context awareness model has values available for. These fields can be automatically filled in for the user, thereby freeing him or her of the time needed to do so (and even the knowledge that they are being filled in). Alternatively, these fields can be displayed, or displayed only under certain circumstances. For example, a context model provided by a company may include fields used for accounting, security, and performance measurement that cannot be displayed with default user privilege.

As there are many product area forms potentially useful to a user, organization and search capabilities such as keyword search, graphic information-tree traversal, and many other techniques as provided in file browsers, Internet search engines, and online broadcast program schedules may optionally be made available by PIC builder 308.

Additionally, PICs can include specification of when and how a PIC result should be presented. This specification of when and how PIC results should be presented is limited only by availability of criteria in the context model. However, since the context awareness model is user extensible, users are free to add new model attributes. For example, a user may purchase for his or her car a device that allows him or her to use an alternative fuel. The user could then add to his or her context model a new attribute/field, associated with other attributes related to his or her car, having an indication of interest/desirability/ability to use this alternative fuel. Now a PIC can be created that shows the user a list of sources of the fuel within the limits of the car's fuel-determined cruising range.

Figure 6:
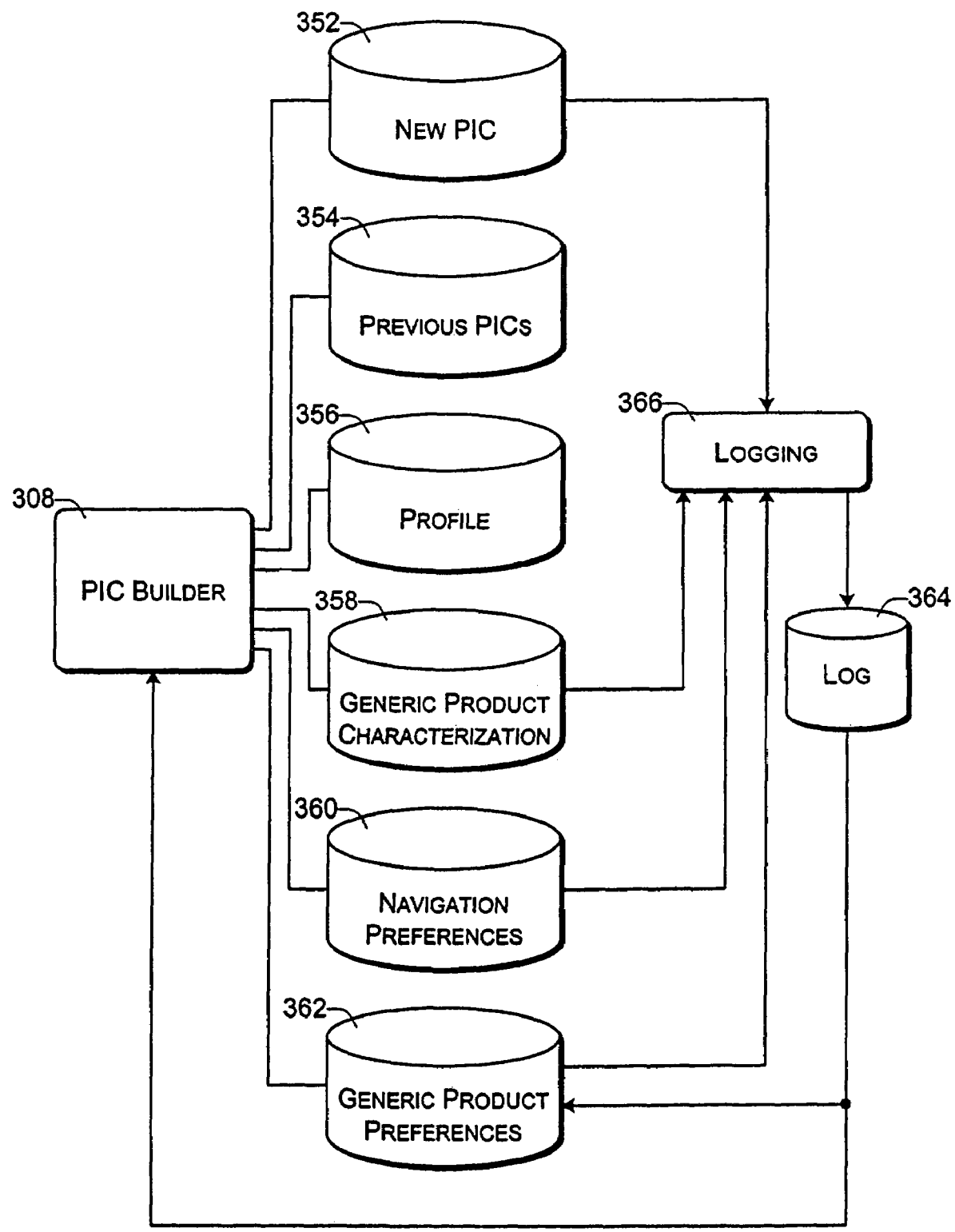
FIG. 6 illustrates product interest characterization generation and storage in additional detail.

FIG. 6 illustrates PIC generation and storage in additional detail. Information to assist in the generation and modification of PICs by PIC builder 308 is available to the user via multiple PIC data stores. In the illustrated example of FIG. 6, these PIC data stores include: new PIC data store 352, previous PIC data store 354, user profile data store 356, generic product characterization data store 358, navigation preferences data store 360, and generic product preferences data store 362. Additionally, a log 364, managed by a logging component 366, is also accessible to PIC builder 308.

New PIC data store 352 is used to generate a unique PIC. Data store 352 can contain different types of information, such as information provided by the user to characterize new information (e.g., a new product) of interest. Data store 352 may also include information previously provided by the user to characterize other information (e.g., product(s)) of interest. This information may be included because the user indicated a desire to have PICs with similar fields share values as default. Additionally, system-suggested information may also be included. For example, based on previous PICs, the system can suggest PIC fields and values based on previous user behavior. A more detailed explanation of such predictive behavior can be found in a co-pending U.S. patent application Ser. No. 09/825,159, entitled "Thematic Response To A Computer User's Context, Such As By A Wearable Personal Computer" to James O. Robarts and Eric Matteson, which was filed Apr. 2, 2001, and is commonly assigned to Tangis Corporation. This application is hereby incorporated by reference.

Previous PIC data store 354 includes all PICs generated by the user, either active or inactive, until deleted by the user. These are available for modification (or change of status), as well as for reference when generating new PICs.

User profile PIC data store 356 contains product-independent information. Examples of the type of information contained include: user identification information (e.g., name, alias, anonymizing ID, etc.); financial transaction data (e.g., credit card data, bank account data, authorizations (such as list of trusted institutions, indication of whether explicit user verification is required), transaction limits, etc.); authorizations (e.g., indication of trust per external institution or person, default permissions, permission overrides, need for accounting logs, etc.); and so forth.

Generic product characterization data store 358 allows the user to rely on recognition rather than recall to create a PIC. This is valuable because the PIC fields required for the precise characterization of a product interest are significantly different for different types of products, and there are many of them, and they can change over time. Therefore, a generalized taxonomy of generic products is provided, that can be navigated (e.g., hierarchically, graphically with pseudo-spatial relationships, keyword searched, and so forth) similarly to actual product catalogs (e.g., online Yellow Pages). As the user traverses the data store, he or she can both be learning about general product characteristics (new luxury SUVs are available from which manufacturers, in a bounded price range), and providing candidate fields and values for the PIC Builder (for storage in data store 358).

Navigation preferences data store 360 maintains a record of the explicit and inferred user preferences for using the generic product characterization data store 358. Examples of such records include: navigation preferences (e.g., showing an hierarchical tree organized by color, building Boolean logic with compositing transparent filter frames like conventional Magic Lens filters, etc.); previously explored areas of the data store (e.g., ID shows previously navigated links in different color), and so forth.

Generic product preferences data store 362 records a user's indication that a particular generically described product is of interest.

Log 364 lists all previously used PIC fields. Log 364 can combine values from previous PICs 354, Generic Product Preferences 362, and inferred product interest from Pattern Recognizer.

Returning to FIG. 5, once a PIC is generated and made active by user 316, the PIC is made available to PIC sender 310 which distributes the PIC to one or more information sources 302 and/or 304. One or more sending options for the PIC may also be identified by the user or automatically (e.g., based on the user's context). The sending options identify how, when, and/or where the PIC is sent. For example, the PIC may be saved until bandwidth is available, or collected in a set of PICs (e.g., perhaps purchases of products need to be coordinated: medication, scuba diving equipment, computer hardware & software). Once the sending options have been indicated, the actual process of sending a PIC and receiving responses can be transparent to the user. The user may simply see the results of the query.

Once sent, the PIC is compared to data in those information sources, and an indication of any match returned to PIC receiver 312. The matching information is then returned by PIC receiver 312 to presentation manager 314 for presentation to the user. PIC receiver 312 is responsible for handling the communications from the content sources, and is concerned with the content. For instance, PIC receiver 312 could stack rank the received data. Presentation manager 314, on the other hand, is primarily dealing with the presentation of the data (e.g., is there a display available? Can it handle color?).

What is received by PIC receiver 312 may be a completed PIC, a data packet associated with a PIC, or even a product itself (e.g., radio cablecast link, MPEG file, etc.). PIC receiver 312 can optionally combine the results of multiple active PICs. For instance, a user may send two similar PICs: one for a new car and one for used cars. PIC receiver 312 handles all solicited information, optionally verifyng that received information matches an active PIC, and storing the information for immediate or delayed presentation. PIC receiver 312 can be explicitly configured by the user and/or determined by rules embedded in the context model and PIC Manager. In one implementation, PIC manager 212 is an extension to the general context model 214 of FIG. 3.

PIC receiver 312 may also optionally include an appropriateness filter that is used to determine whether the query results are returned to presentation manager 314, or the appropriateness filter may be a separate component of PIC manager 212. In some situations, the filter may not be needed. For example, a PIC may be submitted both to a broker trusted not to provide information inappropriate to children, and to other product information sources. It may not be necessary to have the trusted PIC results filtered for inappropriate content, while other results are filtered for inappropriate content.

Additionally, the appropriateness filter may be used by PIC receiver 312 to defer delivery of query results. For example, the user may have insufficient attention to attend to them because he or she is working on other tasks, is sleeping, etc. In this case the query results are available to the user if he or she decides to view them, provided that doing so does not violate some other context model rule (for example, it may be unsafe to do so because user is driving in heavy traffic, or system may have security schemes that only allow the use of PICs during certain hours, or at specified locations, or while performing particular tasks).

In addition, PIC receiver 312 may use the user context to determine how filters get applied to the content. For example, a user may generate a PIC for information about changing a flat tire. However, the search may take a long time and the results of the search may not be returned to PIC manager 212 until after the user has fixed the flat tire. In this situation, the appropriateness filter can filter s out the search results and not have them presented to the user because based on the user context (the flat tiring having been fixed), the search results are no longer important to the user.

PIC receiver 312 (or alternatively presentation manager 314) may also communicate with context awareness model 214 or characterization module 216 of FIG. 3 to present information in an improved form. Context model 214 includes logic that describes functional and presentational characteristics of a desired UI for the current user context. This may include UI layout, selection of presentation surface, privacy, and so forth.

Figure 7:
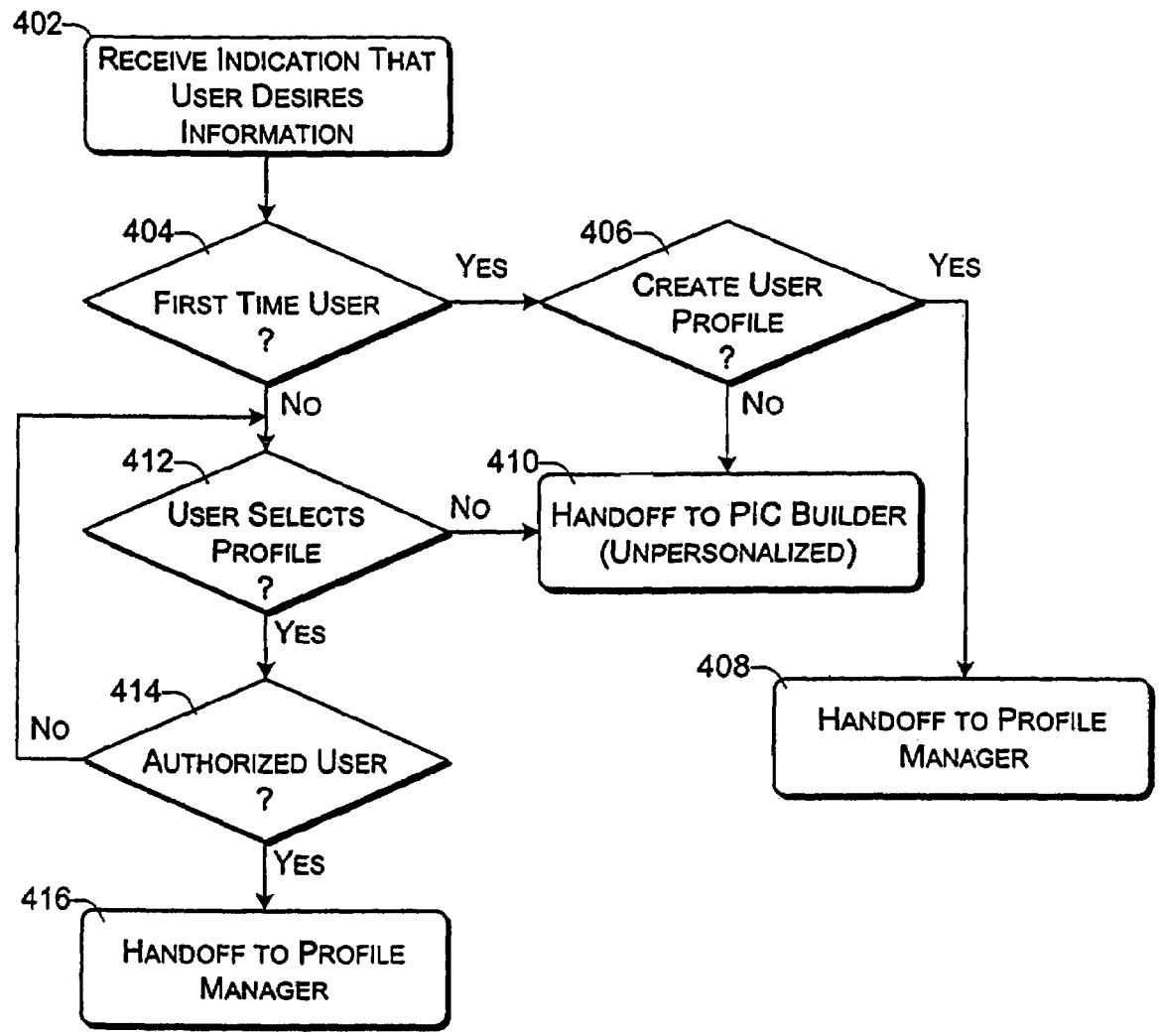
FIG. 7 is a flow diagram illustrating an exemplary process followed by a product interest characterization manager.

FIG. 7 is a flow diagram illustrating an exemplary process followed by a PIC manager 212 of FIG. 5, which may be performed in software. Initially, an indication that a user desires information is received (act 402). A check is made as to whether the user is a first-time user of the information solicitation system (act 404), and if so gives the user the option to create a user profile (act 406). If the user desires to create a user profile, then processing is handed to the profile manager (act 408) to establish a user profile and PIC. However, if the user does not wish to create a user profile, then processing is handed to the PIC builder for generation of an unpersonalized PIC (act 410).

Returning to act 404, if the user is not a first time user of the system, then a check is made as to whether the user desires a particular user profile (act 412). If no user profile is desired, then processing is handed to the PIC builder for generation of an unpersonalized PIC (act 410). However, if a user profile is desired, then the user is verified as an authorized user of the profile (act 414), such as by user ID and password. Processing is then handed to the profile manager for generation of a personalized PIC (act 416).

Figure 8:
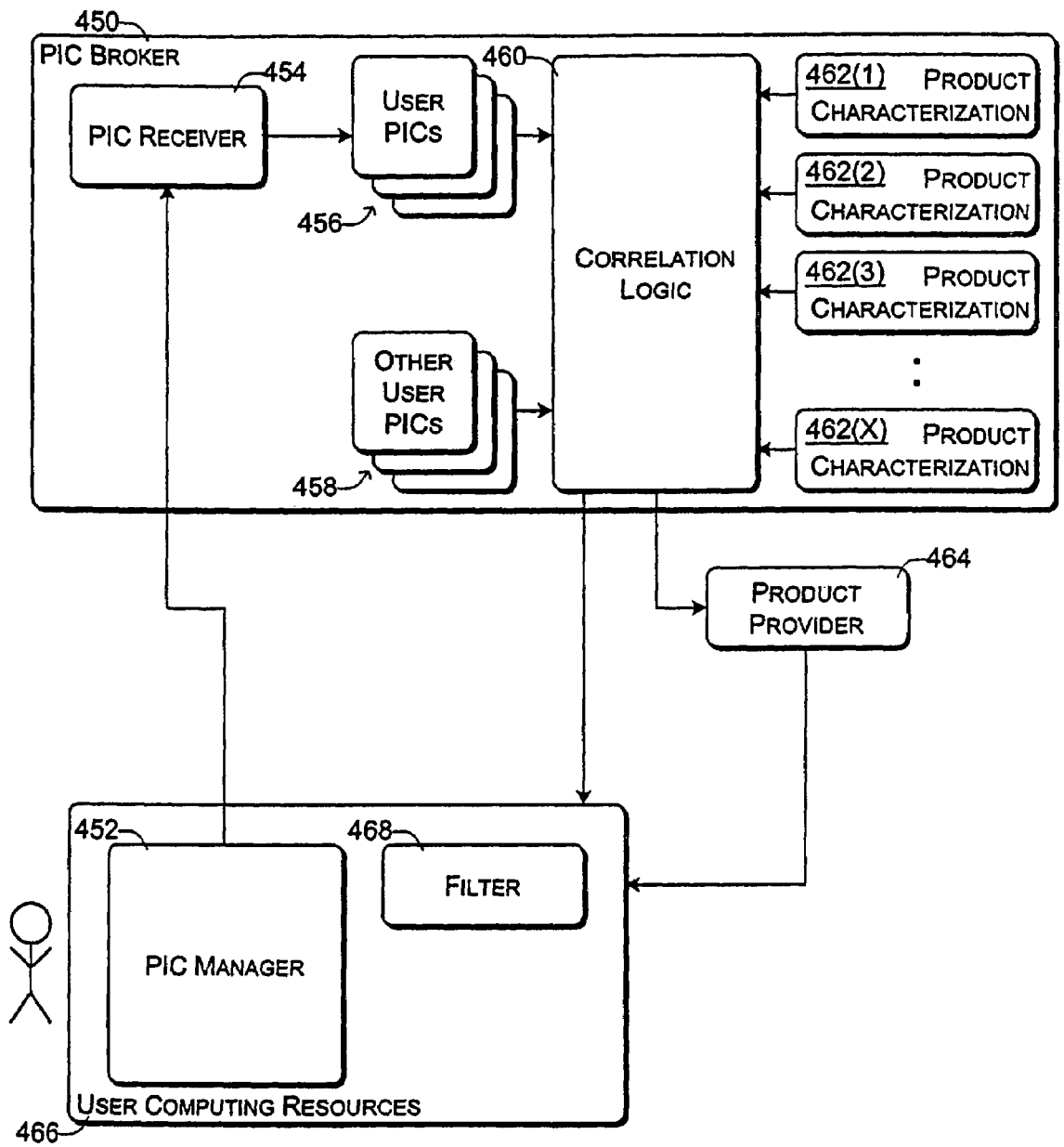
FIG. 8 illustrates an exemplary information solicitation system employing a product interest characterization broker.

FIG. 8 illustrates an exemplary information solicitation system employing a PIC Broker 450. PIC Broker 450 provides a service, in exchange for direct compensation from the user (in the form of money per transaction/subscription or access to their demographics), or indirect compensation (broker provides unsolicited message that advertises other products) or no user compensation. Product providers may compensate PIC Broker 450 at various transaction stages. For example, they may pay for every PIC/product match message sent to user, or when user views message, or when their product is purchased.

When the PIC is created, an indication on what to do when a correlation is found can be included. Some of the options include:

- Immediately provide product—for example, if the PIC characterizes interest in a radio broadcast of discussion of a particular topic, and the content is found to be available, the PIC could have been created authorizing its immediate presentation.
- Immediately notify the user—notification can include terse message (a PIC has a match, a particular PIC has a match) or arbitrarily complex descriptions. Descriptions could scale to the entire correlation result (a composite value of strength of match, description of what characteristics do or do not match, source of product, supplemental information provided by PIC Broker including ID, recommendations or review of product or product provider, suggestions).
- Submit results to Appropriateness Filter—even if a message describes it as from a trusted source, and provides a perfect match between interest and product characterization, it may not be desirable or safe to present it immediately, or in a particular form, or even for a particular user (e.g., though a PIC could indicate that products provided must be suitable for children, PIC brokers may not be reliable. By always submitting product messages to filtering, a higher degree of confidence of appropriateness can be achieved.
- Cache messages until requested—the PIC Broker can wait until contacted to present correlation results. Note this is in contrast to having the user's computing environment store them. In either case, one convenient way to view them is via the PIC Manager.

Once generated, the PIC is communicated by PIC manager 452 to a PIC receiver 454 at PIC broker 450. The PICs 456 from this user, as well as other PICs 458 from other users, are made available to a correlation logic 460. Correlation logic compares the search criteria in the PICs 456 and 458 to multiple product characterizations 462(1), 462(2), 462(3), . . . , 462(X). Any of the product characterizations 462 that satisfy the search criteria are communicated to the product provider(s) 464 corresponding to the matching product characterization(s), which in turn provide the corresponding product information (or the product itself) to the user computing resources 466 (e.g., a client 106 of FIG. 2). Correlation logic 460 may also optionally provide the product characterizations 462 that satisfy the search criteria to the user computing resources 466. The product information or characterization received at resources 466 may also be filtered by filter 468, which may prevent presentation of the information or characterization, or delay its presentation until an appropriate time.

Different components may be used besides PIC broker 450 to provide information or products. For example, the functionality of PIC broker 450 may alternatively be provided by a product provider(s) 464. By way of another example, "agents" may be used. Agents are semi-autonomous software objects that are less constrained than a PIC broker in that they can theoretically reach a less constrained source of product descriptions. They may therefore provide a more complete set of query results. However, unless they coordinate with PIC providers on the definition of product interest or descriptions, they may not be as precise. Further, since the source of the agent, and what it returns, may not be as controlled as a PIC broker, the results may not be as appropriate.

Yet another example is a content aggregator. Much like a PIC broker, content aggregators can provide interfaces to their data stores compatible with the user's context model (or vice versa, any party can provide a dictionary and write the translation filter). In this scenario very tight control on the product descriptions, including availability, can be provided, insuring timely and accurate product offers. There can also be cooperation between different user models. For example, a variety of affinity mechanisms may be used which suggest products that are similar to the ones requested. The user's context models can directly, or thru the PIC Manager mechanism, indicate if this type of information is desired. The models can also cooperate by sharing the user's desire to have products having a high-correlation (clearly satisfying the PIC) be automatically purchased. Necessary information for purchase can also be exchanged securely.

Figure 9:
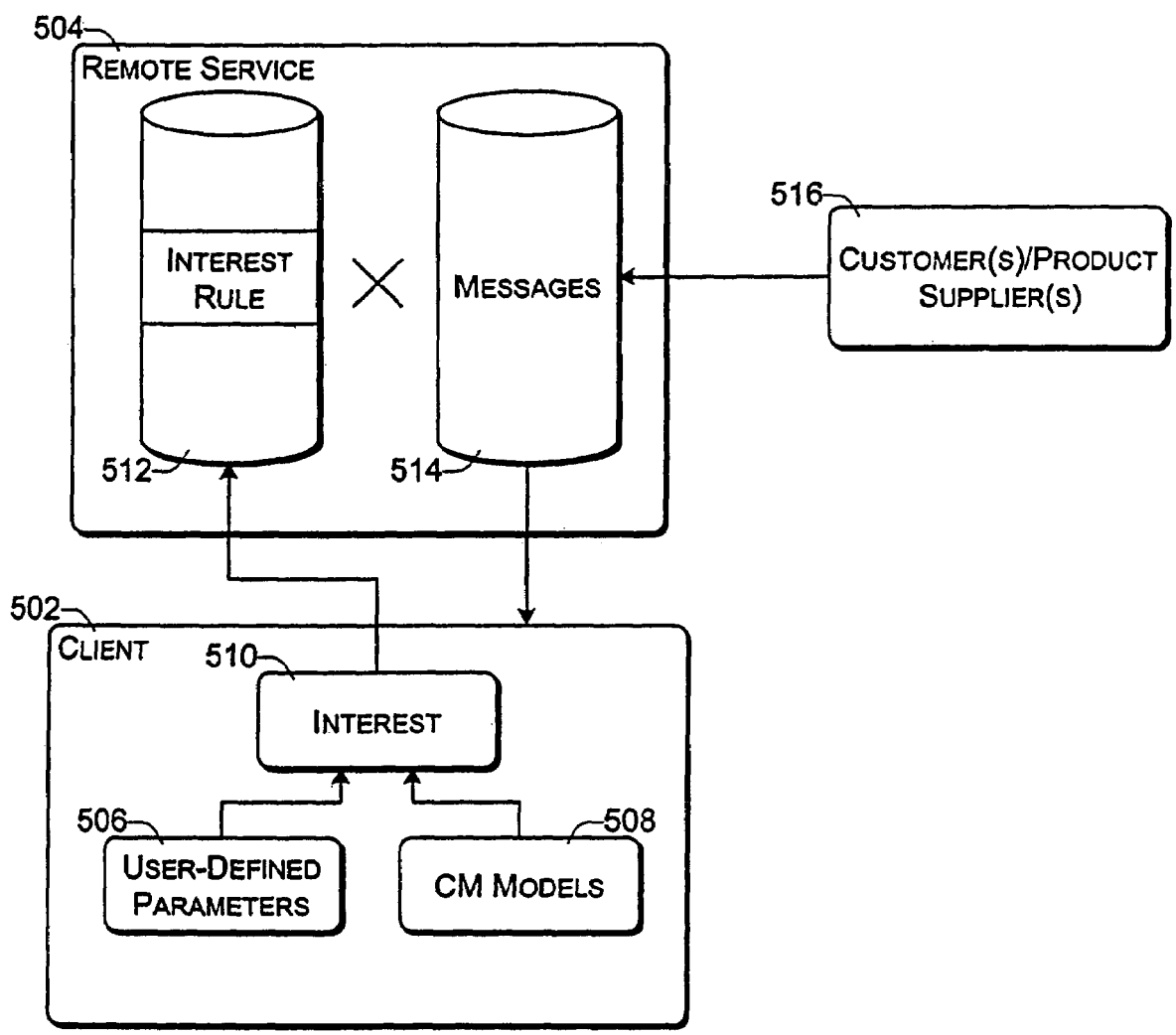
FIG. 9 illustrates another exemplary information solicitation system.

FIG. 9 illustrates another exemplary information solicitation system 500 including a client 502 and a remote service 504. User defined parameters 506 and context module (CM) models 508, also referred to as context awareness models, are combined to determine an interest 510 (e.g., a PIC). The interest 510 is provided to remote service 504, where it is stored along with other interests in an interest rule database 512. The rules (e.g., search parameters) in the interests of database 512 ate then compared to messages 514 (e.g., advertisements or other information) provided to remote service 504 from one or more customers or product suppliers 516. Results of the comparison are then returned to the client for presentation to the user.

Revenue can be generated in system 500 in a variety of different manners. For example, the customers or product suppliers 516 may pay for the ability to have their messages stored as part of messages 514, or the customers or product suppliers 516 may pay for each message forwarded to client 502. By way of another example, the user of client 502 may also receive payment from the sale of the interest to remote service 504, or the user's willingness to receive messages from remote server 504 (e.g., for each message presented to the user).

Various aspects of the solicitation of information described herein can be seen from the following examples. A first example is the purchase of a child car seat. Assume that a user has a computer that maintains an explicit, extensible, dynamic model of his or her context. The user has used this model to maintain a data store of personal, detailed, private information, as well as information that is shared with others and available publicly. He or she is about to become a first time parent, and wishes to purchase a car seat for the new infant, but does not have familiarity with car seats and does not have a lot of time for research. Further, he or she understands that there are likely trade-offs between product characteristics such as price and safety.

Using the Generic Product Description feature, the user can traverse a tree to locate a PIC form that gives the user the following blank fields:
    Weight of Child
    Built In or Removable
    Converts to Mobile Chair?
    Removable Covers?
    Headrest?
    Footrest?
    Optional Padding?

If the user does not use the Generic Product Description feature, he or she can use a similar PIC if he or she had created one, or use a PIC form from some other source, or create one from scratch. If the user creates it from scratch, he or she could include the fields described above.

Regardless, the resulting PIC could have the following fields already filled out. They could be hidden by default, but can be viewed and modified if desired (assuming security authorizations permit modification):
    Default Priorities: Safety=5, $3^{rd}$ Party Rating=4, Availability=3, Cost=2, Esthetics=1
    Car Model
    Car Interior Color
    User Location
    Preferred in-person Stores
    Availability for in-store shopping
    Willingness to purchase online
    Preferred online suppliers
    Desired product detail (H, M, L)
    Under what conditions can this PIC result in an automatic purchase? (Never, when product match is from a PIC Broker user is subscriber to, and when PIC and product have only one very strong match of top three priorities)
    When user prefers to view product information (within 1 minute, within 10 min, at specific time)
    Who should view product information (self only, self and others, other only)
    How much personal info to automatically divulge (if more details from manufacturer are requested, should they be shared?)
    Where should PIC be sent (to specific information sources only? Trusted sources only? Sources that offer anonymous listings only? Anyone offering related product information?)
    Does this PIC have permission to be forwarded from original receiver?
    Does product information received in response to PIC need to go thru an Appropriateness Filter?
    Should this PIC, and resulting information, be logged? If so, should this information be available to data mining applications?

Once the user is satisfied with his or her PIC, the PIC is submitted to outside product description data stores (information sources). This online distribution does not need to happen immediately, it can be delayed by some preset time or availability of connection to remote computing/communication resources. Eventually, a match is found and the resultant car seat information is returned and presented to the user for him or her to make a purchase selection. Alternatively, the car seat could be automatically purchased on behalf of the user from a product provider and delivered to the user (e.g., via a mail service) or made available for the user's pickup.

Another example of a PIC, which makes use of a context model, is searching for a movie. The fields in the PIC include:
    Location (based on user's current context)
    Maximum movie rating (or youngest age of party)
    Budget
    Recommendation (could engage service like MovieCritic.com, where previous user movie ratings are used with preference & clustering engine to suggest what they would like)
    List of movies already seen
    List of movies interested in
    Time constraints (user's (and parties) schedule/appointments)
    Time of PIC creation Another example of a PIC which makes use of a context model is a PIC for getting a repair procedure. Assume the user is driving in a remote area and has an auto (vehicle) breakdown. The user's PIC is a request for assistance. Appropriate responses would be repair advice in written form from the manufacturer or other expertise publisher (e.g. Chiltons), or remote expert (via cell phone) or listing of closest service stations/towing services (phone number, hours, rates). Fields in the PIC include:
    Location (current and destination)
    Object context (Make/model of car, car self diagnostic info)

User (club memberships (AAA), subscriptions (maybe subscribe to online publishing services), self rating of auto repair expertise Desire of user to obtain repair instructions Another example of a PIC, which can be sent without user interaction or verification (approval is given beforehand within rule logic) is a medical emergency PIC. Fields in the PIC include:

User Location

User Activity

Current Physical Condition

Historic Physical Condition

Current Emotion State

List of Prescribed and taken medication

List of Medication on hand

List of who is in vicinity

Description of immediate environment

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method for soliciting information based on a computer user's context information, said method when coupled to a computer readable storage medium executing the following steps:

receiving a user search request;

identifying context information for the user, the context information including at least an inferred focus of attention for the user;

determining search criteria corresponding to the user search request by combining the user search request and the context information, the context information relating to at least one of the user's physical environment or a user's mental environment;

generating a product interest characterization having a plurality of fields, wherein one or more of the plurality of fields includes the search request received from the user corresponds to the user search request, and wherein another one or more of the plurality of fields includes data received from a context awareness model that provides context information for the user;

performing a search based on the request and the determined search criteria; and providing a search result to said user.

2. A method as recited in claim 1, wherein identifying context information for the user comprises identifying current context information for the user.

3. A method as recited in claim 1, wherein receiving the user search request comprises receiving, as at least part of the user search request, one or more keywords.

4. A method as recited in claim 1, wherein receiving the user search request comprises receiving, as at least part of the user search request, authorization information that indicates how much data provides to different classes of product information providers to which the request is sent, the authorization information changes dynamically as the user's context information changes.

5. A method as recited in claim 1, further comprising: communicating the search criteria to one or more search components; receiving search results from at least one of the one or more search components; and presenting the search results to the user.

6. A method as recited in claim 5, further comprising: filtering the received search results based on the appropriateness of the search results; and presenting the search results to the user comprises only appropriate search results.

7. A method as recited in claim 5, further comprising: determining an appropriate time to present the search results based on the inferred focus of attention; and waiting the appropriate time to present the search results to the user.

8. A method as recited in claim 1, wherein the user search request is a request to retrieve information regarding one or more of a product or a service.

9. A method as recited in claim 1, wherein the user search request is a request to obtain a product.

10. A method as recited in claim 9, wherein the search criteria is submitted to one or more search components via a network, and the product is returned to the user via the network.

11. A method as recited in claim 9, wherein the search criteria is submitted to one or more search components via a network, and the product is returned to the user via shipping external from the network.

12. A method as recited in claim 1, wherein the context information comprises information regarding one or more of the user's computing environment or the user's data environment.

13. A method as recited in claim 1, wherein the context information comprises information regarding two or more of the user's physical environment, the user's mental environment, the user's computing environment, or the user's data environment.

14. A method as recited in claim 1, wherein the context information comprises physical environment information pertaining to one or more of the user's present location or the current time.

15. A method as recited in claim 1, wherein the context information comprises mental environment information pertaining to one or more of the user's likely intentions, the user's preferences or the user's current attention.

16. A method as recited in claim 1, wherein the context information comprises computing environment information pertaining to one or more of client computer.

17. A computer-readable storage media storing computer-executable instructions for soliciting information based on a computer user's context information that, said executable instructions when executed by a computer system, causing said computer system to perform the following steps:

receiving a user search request;

identifying context information for the user, the context information including at least an inferred focus of attention for the user;

determining search criteria corresponding to the user search request by combining the user search request and the context information, the context information relating to at least one of the user's physical environment or a user's mental environment;

generating a product interest characterization having a plurality of fields, wherein one or more of the plurality of fields includes the search request received from the user corresponds to the user search request, and wherein another one or more of the plurality of fields includes data received from a context awareness model that provides context information for the user;

performing said search based on the request and the determined search criteria; and providing a search result to said user.

18. A system embodied on a computer-readable storage medium that facilitates context-based searching, comprising:
- a characterization module configured to characterize a user's context, the context including at least an inferred focus of attention of the user;
- a search criteria generator configured to generate search criteria corresponding to a user search request and the user's context, the search criteria is coupled to receive a user search request via one or more input devices, and to receive the user's context from the characterization module, wherein the context relating to at least one of the user's mental environment or physical environment, the search criteria generator generating a product interest characterization having a plurality of fields, wherein one or more of the plurality of fields includes the search request received from the user and wherein another one or more of the plurality of fields includes the context data received from the characterization module;

performing said search based on the request and the determined search criteria; and providing a search result to said user.

* * * * *